United States Patent [19]

Kimball

[11] Patent Number: 4,823,895

[45] Date of Patent: Apr. 25, 1989

[54] THREE WHEELED VEHICLE WITH COMBINED POWER TRANSMISSION AND STEERING SYSTEM

[76] Inventor: James F. Kimball, 83617 Rattlesnake Rd., Dexter, Oreg. 97431

[21] Appl. No.: 75,547

[22] Filed: Jul. 20, 1987

Related U.S. Application Data

[63] Continuation-in-part of Ser. No. 919,979, Oct. 17, 1986, abandoned.

[51] Int. Cl.$^4$ ............................ B60K 4/26; B66B 9/20
[52] U.S. Cl. .................................... 180/6.48; 180/210; 180/233; 180/236; 280/166; 74/471 XY
[58] Field of Search ....................... 180/6.48, 6.5, 210, 180/214, 315, 333, 386, 209; 280/47.18, 42.20; 74/471 XY, 473 R, 491, 504

[56] References Cited

U.S. PATENT DOCUMENTS

| | | | |
|---|---|---|---|
| 3,204,791 | 9/1965 | Williams | 414/537 |
| 3,611,827 | 10/1971 | Bottom | 180/6.48 |
| 4,116,457 | 7/1978 | Nerem et al. | 280/166 |
| 4,178,005 | 12/1979 | Kent, Jr. | 280/43.18 |
| 4,281,737 | 8/1981 | Molzahn | 180/6.48 |
| 4,285,416 | 8/1981 | Dudynskyj | 280/166 |
| 4,679,810 | 7/1987 | Kimball | 280/166 |

Primary Examiner—Charles A. Marmor
Assistant Examiner—Donn McGiehan
Attorney, Agent, or Firm—James D. Givnan, Jr.

[57] ABSTRACT

A three wheeled vehicle having a pair of powered main wheels the speed of which is controlled in an independent manner for vehicle speed changes and turning. A caster wheel is carried by a suspension member which is manually adjustable relative the vehicle body. A control mechanism includes an operator control member, first and second linkage means coupling a vehicle control member with first and second variable speed transmission units and permits individual speed and directional control of each transmission unit. Appendages on the control member include swivel components with movement of the control member about multiple axes permitting like or differential movement to be imparted to the first and second linkage means. Linkage biasing springs return the control member to a neutral position in the absence of operator exerted force. A modified control member includes a switch to terminate engine operation upon release of the control member. A socket for the control member positions and locks same in neutral while permitting the engine to run.

11 Claims, 3 Drawing Sheets

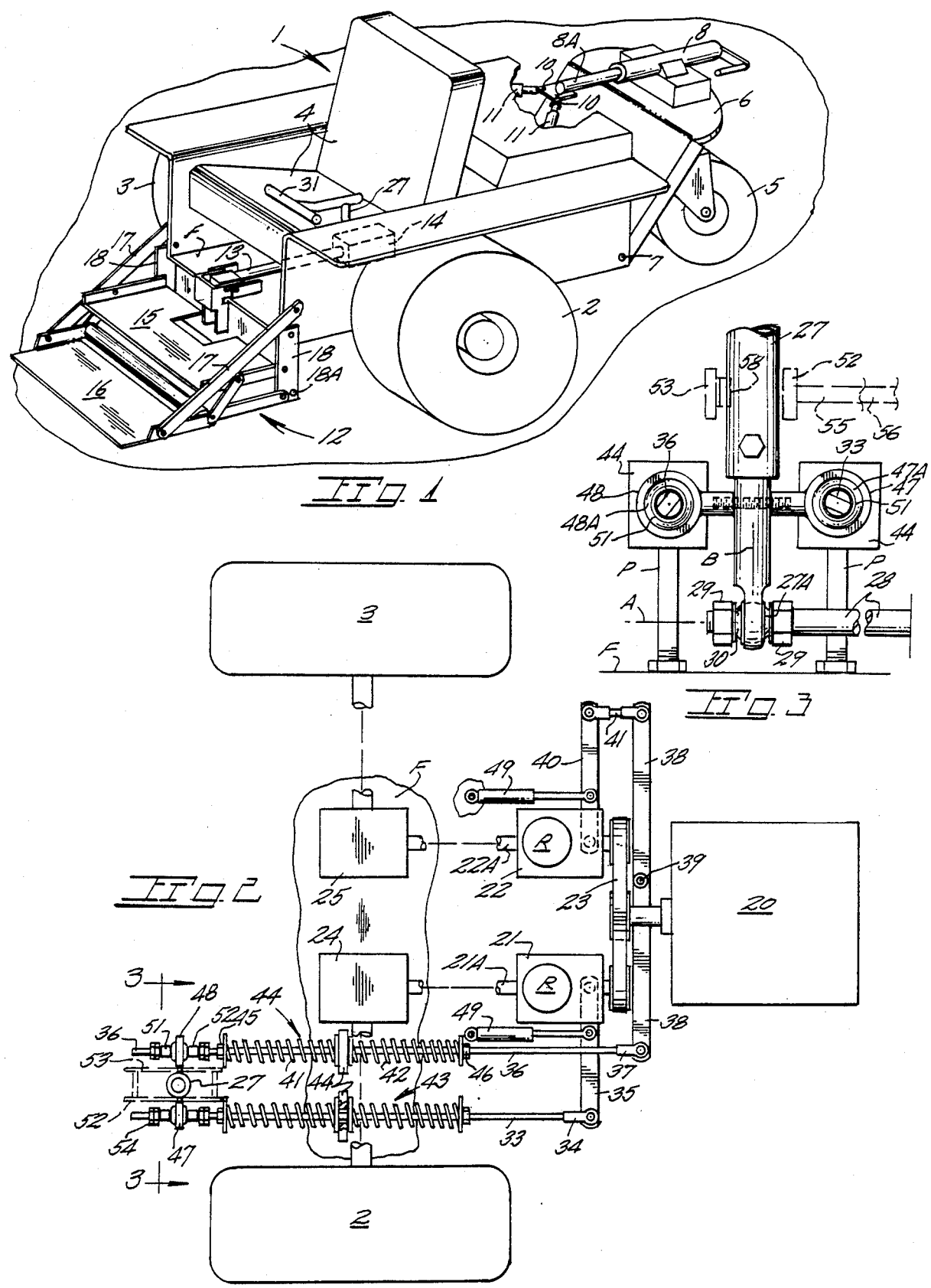

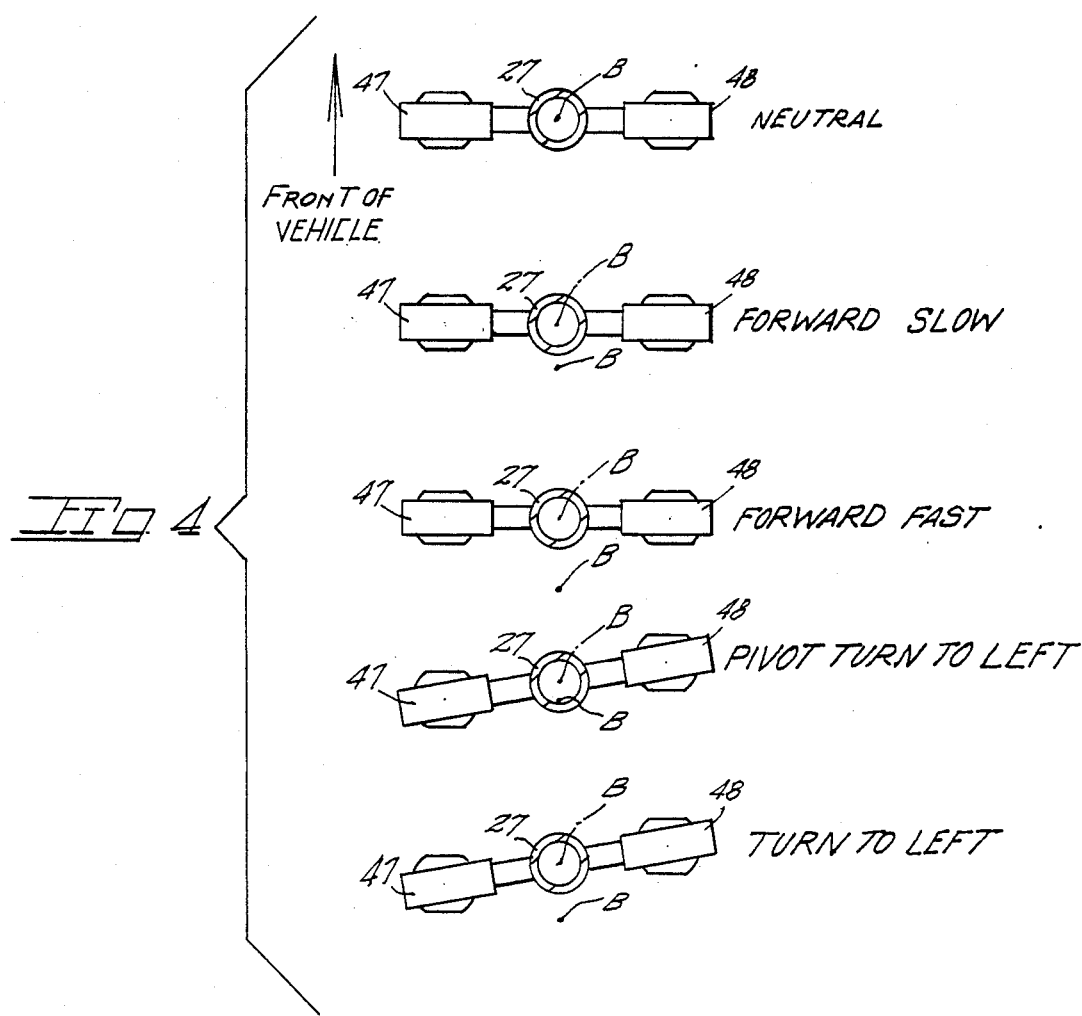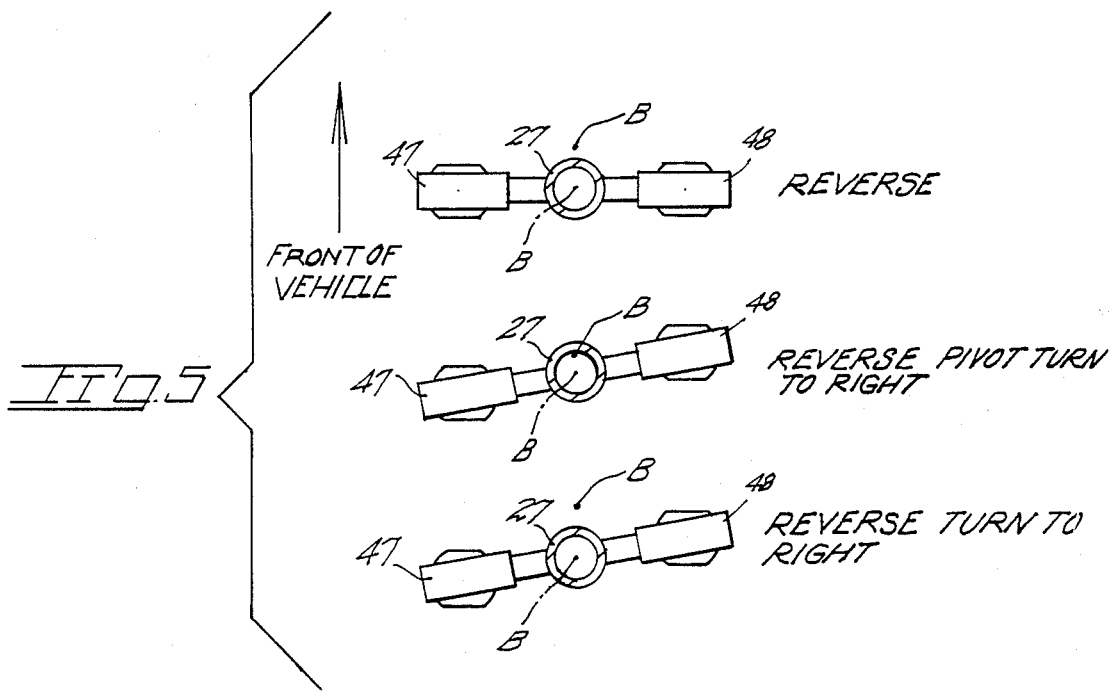

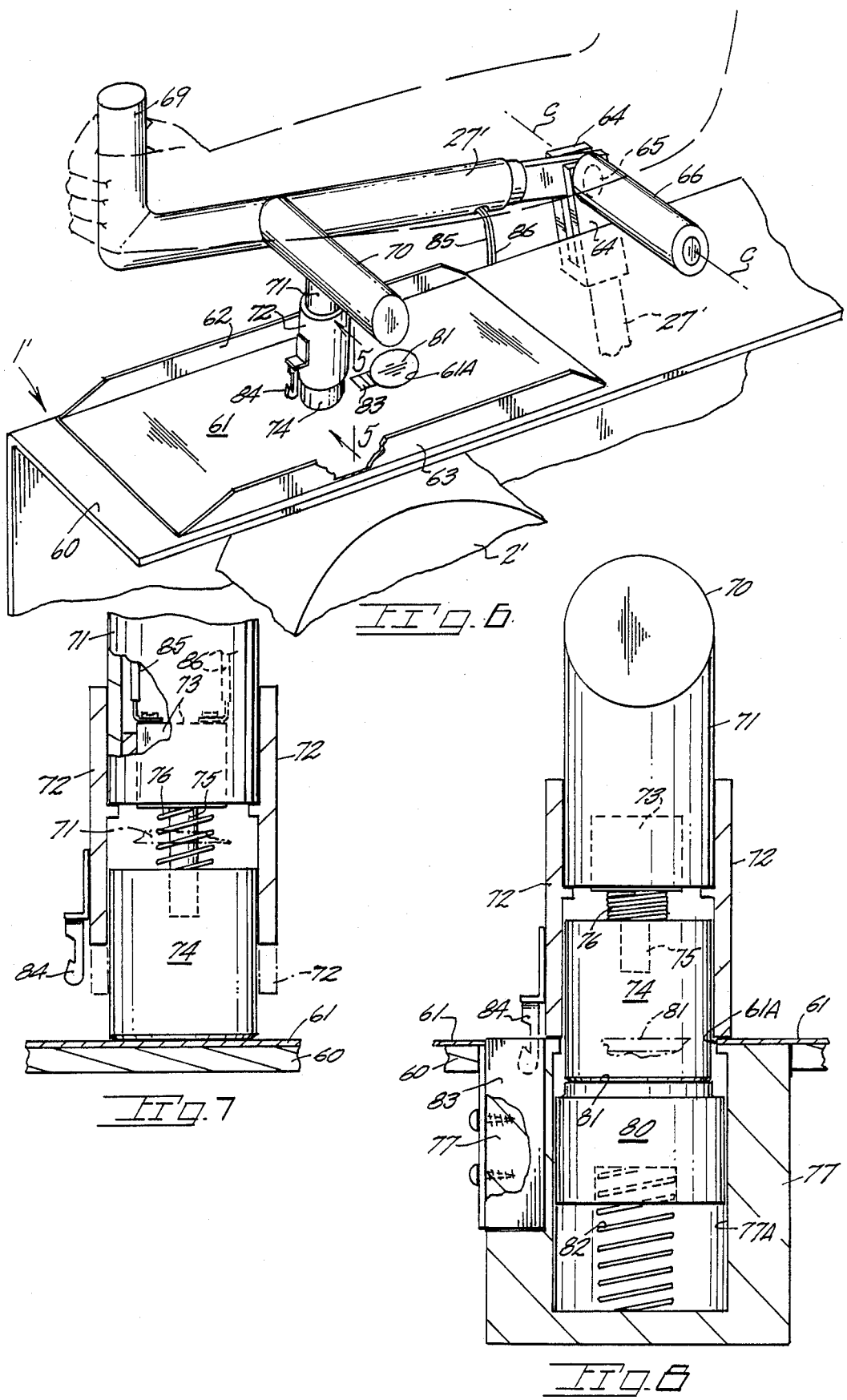

THREE WHEELED VEHICLE WITH COMBINED POWER TRANSMISSION AND STEERING SYSTEM

BACKGROUND OF THE INVENTION

The present application is a continuation-in-part of my copending U.S. patent application Ser. No. 06/919,979 filed Oct. 17, 1986, now abandoned filed by the present inventor and bearing the same title.

The present invention pertains generally to a vehicle with a power transmission system and particularly to one having an operator control member for controlling speed and direction of a wheel supported vehicle such as the type shown in my copending U.S. patent application Ser. No. 06/879,968 filed June 30, 1986, and which issued on July 14, 1987, as U.S. Pat. No. 4,679,810.

Experiencing wide popularity currently are three wheeled vehicles, termed in the trade ATV's, which are ridden primarily for recreational purposes. Such vehicles are of the tricycle type with a steerable front wheel and with powered rear wheels. Such vehicles are very unstable to the extent that legislation is being considered to ban or at least restrict the use of such vehicles in an attempt to diminish the high accident and injury rate associated with such vehicles.

SUMMARY OF THE PRESENT INVENTION

The present invention is embodied in a vehicle having a power transmission system for controlling both the speed and direction of a vehicle by changes in wheel speed.

The present vehicle utilizes variable speed transmissions each coupled to a wheel. A single control member serves to control both transmissions both as to speed and direction of transmission output shaft rotation. Accordingly, both vehicle speed and direction are controlled by the operator control member. Said control member moves about multiple axes to position transmission linkage in a synchronous manner for speed changes or, alternatively, in a differential manner for turning of the vehicle. Automatic biasing means biases the control linkage to position the transmissions into neutral in the absence of operator exerted force on the control member.

Important objectives of the present power transmission system include the provision of a vehicle with a power transmission system which permits an operator of a vehicle to control both vehicle speed and direction with a single control with displacement of the control from a neutral position being proportional to vehicle speed changes and rate of turns; the provision of a vehicle with a power transmission system utilizing a control member positionable about multiple axes and coupled with reversible, variable speed transmissions each driving a vehicle wheel resulting in a highly maneuverable vehicle; the provision of a wheeled vehicle having at least a pair of independently powered wheels with additional wheel means being of the caster type to permit vehicle speed changes and directional changes by positioning of an operator control member which moves about multiple axes; the provision of a control member in the power transmission system which includes switch means to terminate engine operation upon accidental or intentional release by the operator and which may be locked in a neutral position for engine starting and idling.

BRIEF DESCRIPTION OF THE DRAWINGS

In the accompanying drawings:

FIG. 1 is a perspective view of the vehicle embodying the present invention;

FIG. 2 is a plan view of the present power transmission system removed from the vehicle;

FIG. 3 is a vertical sectional view taken along line 3—3 of FIG. 2 and showing a control member mounting arrangement;

FIG. 4 is a schematic showing several positions of the control member relative a neutral position for said member;

FIG. 5 is a schematic similar to FIG. 4 but showing control member positions for reverse operation of the vehicle;

FIG. 6 is a perspective view of a modified control member;

FIG. 7 is a vertical elevational view taken along line 7—7 of FIG. 6; and

FIG. 8 is a view similar to FIG. 7 but with the control member repositioned rearwardly into a neutral position and confined within socket means.

DETAILED DESCRIPTION OF THE PREFERRED EMBODIMENTS

With continuing attention to the drawings wherein applied reference numerals indicate parts similarly hereinafter identified, the reference numeral 1 thereon indicates generally a three wheeled vehicle in which the presently described power transmission system may be utilized.

The vehicle includes a pair of left and right powered wheels at 2 and 3 on opposite sides of the vehicle body as viewed from an operator seat at 4. A caster mounted wheel is at 5 carried in a vertically adjustable manner by a body mounted suspension member 6 which, in turn, is positionable about a pair of frame carried trunnions as at 7. Chassis member 6 carries a manually operable linear actuator at 8 which has an extensible end at 8A coupled via fittings at 10 to the ends of a pair of shock absorber units 11 having their base ends (not shown) attached to the body of the vehicle. Accordingly, the vehicle body may be tipped or adjusted about the axis of wheels 2 and 3 upon extension or retraction of actuator end 8A for the purpose of convenient attachment of a step assembly member, later described, to a tow vehicle.

The front end of the vehicle is equipped with a step assembly indicated generally at 12 and which is the subject of a copending U.S. patent application filed June 30, 1986, under Ser. No., 06/879,968. For present purposes it is deemed sufficient to say that the step assembly includes a linear actuator rod 13 powered by a motor 14 which upon retraction of actuator powered rod 13 imparts clockwise or lifting movement to steps at 15 and 16 to the extent they are elevated from the ground for vehicle travel. Detachable braces are at 17, which upon removal after step elevation, permit the outermost step to be swung rearwardly for towing of the vehicle. Step members at 18 are apertured at 18A for attachment to a tow vehicle when the step assembly is elevated.

The present power transmission system, as best shown in FIG. 2, includes a power source or engine 20 in driving engagement as by a belt drive 23 with hydraulic transmission units 21 and 22 having output shafts 21A–22A Each unit has a separate reservoir R. Gear reduction drive means for each wheel are at 24 and 25.

An operator actuated vehicle control mechanism includes a control member at 27 which is equipped with a swivel eye 27A supported in an upright manner by a support 28 having a truncated ball 30 permitting movement of the control member about a horizontal axis A and an upright axis B. Control member movement about axis A will be fore and aft of the vehicle in response to fore and aft movement of an operator's arm. Movement of the control member about upright axis B results from swinging handgrip 31 to the left or right of a vertical plane containing axis B. Nut elements 29 confine ball 30 on support 28.

With continuing reference to the control mechanism, the same includes a first linkage consisting of a rod 33, a fitting 34 thereon and a control arm 35 on transmission unit 21. Arcuate movement of arm 35 results in speed changes and direction changes of unit 21. A second linkage includes a rod 36, a fitting 37 thereon, a toggle link 38 pivotally mounted at 39 and pivotally coupled to a transmission control arm 40 by means of a coupling 41. Accordingly, like axial movement of rods 33 and 36 of the two linkages will impart like rotational movement to control arms 35 and 40 for a synchronous speed or speed and direction of transmission output shafts 21A and 22A. Control arm movement is dampened by hydraulic dampeners at 49.

Linkage biasing means, generally at 43 and 44 in FIG. 2, serve to automatically axially position rods 33 and 36 whereat transmission control arms 35 and 40 are automatically positioned to render the transmissions neutral with zero output shaft speed. Such biasing means is the same for both linkages hence only one will be described. Helical springs 41 and 42 oppositely abut a centrally disposed, apertured abutment 44 (apertured for passage of rod 36) suitably secured to the floor F of the vehicle body by a post P. The outer end of each spring is confined by a washer and nut assembly at 45 and 46.

To confine control member 27 for travel fore and aft a pair of barriers at 52 and 53 are provided which also include mounting arms 55 and 56.

For imparting axial movement to linkage rods 33 and 36, first and second appendages at 47 and 48 are provided on control member 27 in an oppositely offset manner per FIG. 3. The appendages 47 and 48 are shown in the form of swivel rod ends which house spherical elements 47A-48A which are fixed in place on the linkage rods 33 and 36. It has been found convenient to make rods 33 and 36 out of threaded rod stock which permits the spherical elements 47A-48A to be secured in place by means of pairs of sleeves 51 and 52 confined by nut elements and lock nuts as at 54. Uniform displacement of the appendages results in like speed changes to both transmissions and wheels for vehicle speed changes along a straight course.

Upon rotational movement of control member 27 about upright axis B, the appendages will axially displace one linkage rod 33 or 36 relative the remaining linkage rod to cause a difference in the speed of transmission output shaft 21A-22A resulting in different wheel speeds to steer or turn the vehicle. Such rod displacement is against the action of a helical spring 41 or 42 of the biasing means which serves to return the control member (in the absence of operator control) to neutral with axis B thereof located at the neutral or fixed line position of FIGS. 4 and 5. The linkage is arranged to effect running of the vehicle in the same direction that handgrip 31 is swung by the operator.

Backing of the vehicle along a straight course is achieved by operator movement of control member 27 rearwardly from the neutral position as shown in FIG. 5. As was the case with forward travel of the vehicle, asymmetrical positioning of the appendages relative the neutral (solid line) position of axis B will impart a turn to the vehicle by reason of a difference in the speeds of transmission output shafts 21A-22A.

To assist the operator in rapidly and manually locating control member 27 in the vertical or neutral position, a leaf spring detent at 58 is provided on control member barrier 53. Such positioning of the control member will, of course, automatically occur by means of the linkage biasing means generally at 43 and 44.

The reversible, variable transmission units 21 and 22 may be units made and sold by the Eaton Corporation and known in the trade as Hydra-Static transmissions, Model 700. The gear reduction drive means at 24 and 25 may be suitably embodied within right angle worm drive units having a 20 to 1 speed reduction output.

In the modified form of the control member shown in FIGS. 6, 7 and 8, structure corresponding to that earlier described is identified with like prime reference numerals.

A portion of a vehicle is indicated generally at 1' and includes a fender 60 over a wheel 2'. The fender carries a skid plate 61 bounded at its sides by barriers 62 and 63. A control member at 27' includes a clevis 64 which receives a pivot pin 65 having an axis C and supporting arm rest at 66. Control member 27' terminates downwardly in supported attachment to a universal coupling such as that shown at 30 in the first form of the invention to permit the modified control member 27' to move in like fashion about axes A and B. A portion of the modified control member additionally moves about a horizontal axis C.

The control member 27' also includes a handgrip 69 and a forward arm rest 70 from which an extension 71 depends with a sleeve 72 fixed thereon. A grounding or "kill" switch 73 is housed within extension 71 and is of the spring return type with normally open contacts which may close (upon release of control member 27') to establish a circuit to ground to interrupt the ignition circuit of the vehicle engine. Slidably carried within sleeve 72 is a block 74 which acts on a switch button 75. A helical spring 76 biases block 74 and hence stem 75 downwardly to the switch opening position of FIG. 7. During vehicle operation the operator's arm at rest on control member 27' urges said member downwardly about axis C resulting in switch 73 being open to permit continuous engine operation. Accidental or intentional release of the control member permits spring 76 (and an internal switch spring not shown) to displace the switch upwardly from block 74 resulting in closure of the switch contacts to disable the vehicle power source as for example by grounding an engine ignition system.

The control member 27' has a neutral position wherein the hydraulic transmission output shafts 21A-22A will be stopped while the engine idles. Such neutral positioning of the control member is provided by control member lock means including a socket 77 defining an open area 77A located subjacent an opening 61A in skid plate 61. Said lock includes a plug 80 biased to the broken line, elevated position in FIG. 8 by a spring 82 whereat a plug surface 81 is coplanar with skid plate 61 to close opening 61A when the control member is in place on the skid plate for unobstructed travel of said member about the skid plate. Surface 81 permits smooth passage of block 74 therepast during vehicle operation. At such time as the operator wishes to stop the vehicle, control member 27' is located so as to locate block 74 over plug 80 whereupon downward displacement of the control member by operator arm effort will cause block 74 to enter into socket 77 and open area 77A therein without engine stoppage as switch 73 remains open by reason of the action of spring 82 biasing the plug 80 and block 74 upwardly per FIG. 8 to keep switch stem 75 retracted.

A latch at 83 is carried in an inset manner by socket 77 having a top entry opening to receive a hook 84 mounted on sleeve 72. Said latch is of the push-to-release type such as that manufactured and sold under the registered trademark TUTCH LATCH and described in U.S. Pat. No. 2,637,576. Latch components are spring biased to engage hook 84 with hook release achieved by momentary downward displacement of hook 84 by the operator.

At least one of the electrical leads at 85 and 86 is in circuit with the ignition system of engine 20 with the remaining lead grounded to the vehicle.

In use, modified control member enables stopping of the off-the-road vehicle by release of the control member. Vehicle braking to a stop will occur gradually as the hydraulic transmission output shafts will come to a stop in a uniform and gradual manner.

Locating the control member 27' in a neutral, locked position requires only manual guidance of the member into place onto plug surface 81 whereat increased downward pressure by the operator will cause block 74 to enter socket 77. The resistance of plug 80 to block entry will assure continued collapse of spring 76 with retracted switch stem 75 maintaining switch contacts open for continued engine operation in neutral. Latch 83 will effect retention of the inserted control member within socket 77. Accidental unlatching of control member 27' results only in engine stoppage.

While I have shown but a few embodiments of the invention, it will be apparent to those skilled in the art that the invention may be embodied still otherwise without departing from the spirit and scope of the invention.

Having thus described the invention, what is desired to be secured in a Letters Patent is:

I claim:

1. A power transmission system for a wheel support vehicle, said system comprising in combination,
    a power source,
    a first and second variable speed hydraulic transmission unit having output shafts and driven by said power source, drive means coupling the transmission output shafts to some of the vehicle wheels, and
    an operator actuated vehicle control mechanism including a control member, mounting means supporting said control member for movement both about a horizontal axis and a generally upright axis, first and second appendages oppositely offset from and carried by said control member, first and second linkages coupling said first and second appendages to said first and second transmission units whereby movement of said control member about said horizontal axis will simultaneously increase or decrease the output shaft speed of said transmission units in a synchronous manner while movement of said control member about the upright axis will alter the rotation of said transmission output shafts in a differential manner, said control member housing switch means in circuit with said power source, said control member slidably supported by a vehicle surface, said control member adapted for movement toward and away from said vehicle surface to open and close said switch means in response to operator exerted pressure on the control member and the absence of such pressure whereby in the absence of such operator exerted pressure on the control member this switch means will disable the power source.

2. The power transmission system claimed in claim 1 wherein said first and second linkages each include biasing means positioning the linkages to a neutral position in the absence of operator exerted force on the linkages.

3. The power transmission system claimed in claim 1 wherein said transmission units are of the reversible type.

4. The power transmission system claimed in claim 1 wherein said first and second appendages include swivel couplings with spherical elements and engaging said linkages.

5. The power transmission system claimed in claim 1 wherein said transmission units include a self-contained fluid source.

6. The power transmission system claimed in claim 1 wherein said control member is of segmented construction including pivot means having a horizontal axis.

7. The power transmission means claimed in claim 6 wherein said control member includes a block slidably supported by the vehicle surface and acting on said switch means.

8. The power transmission means claimed in claim 7 additionally including lock means including a socket into which block may extend to prevent horizontal displacement of the control member to maintain same in a neutral position to render the output shaft of the hydraulic transmission units static.

9. The power transmission means claimed in claim 8 additionally including latch means operable to retain said block in said socket.

10. The power transmission means claimed in claim 9 wherein said socket includes a plug, spring means biasing said plug to a raised position coplanar with said vehicle surface for uninterrupted block passage thereover during control member movement on said surface, said latch means additionally operable to maintain the control member in a lowered switch opening relationship with said socket and said plug therein permitting engine operation with the control member in said neutral position.

11. The power tranmission system claimed in claim 1 wherein said drive means are paired gear reduction units with each unit having a right angle worm drive whereby wheel rotational speed is at all times proportional to hydraulic transmission unit speed to effect both vehicle acceleration and braking.

* * * * *